United States Patent [19]
Cassidy et al.

[11] Patent Number: 5,666,557
[45] Date of Patent: Sep. 9, 1997

[54] METHOD AND APPARATUS FOR AUTOMATICALLY ASSIGNING DEVICE IDENTIFIERS ON A PARALLEL DATA BUS

[76] Inventors: Bruce Michael Cassidy, 898 Ponce DeLeon Dr., Boca Raton, Fla. 33432; S. M. Rezaul Islam, 3380 Jaywood Ter., Apt. 226, Boca Raton, Fla. 33431

[21] Appl. No.: 711,711

[22] Filed: Sep. 12, 1996

Related U.S. Application Data

[63] Continuation of Ser. No. 260,640, Jun. 16, 1994, abandoned.

[51] Int. Cl.[6] .................................................. G06F 13/00
[52] U.S. Cl. ...................... 395/828; 395/830; 395/835; 395/837; 395/182.04; 395/183.01; 395/183.2; 711/100; 711/114
[58] Field of Search .................................... 395/828, 830, 395/833, 835, 837, 183.2, 183.01, 182.04, 575, 441, 427

[56] References Cited

U.S. PATENT DOCUMENTS

| | | | |
|---|---|---|---|
| 4,038,320 | 7/1977 | Shah et al. | 395/275 |
| 4,775,931 | 10/1988 | Dickie et al. | 395/275 |
| 5,038,320 | 8/1991 | Heath et al. | 395/275 |
| 5,175,822 | 12/1992 | Dixon et al. | 395/275 |
| 5,222,218 | 6/1993 | Smith | 395/291 |
| 5,317,693 | 5/1994 | Cuenoe et al. | 395/275 |
| 5,419,804 | 5/1995 | Heath et al. | 395/827 |
| 5,420,987 | 5/1995 | Reid et al. | 395/325 |
| 5,428,748 | 6/1995 | Davidson et al. | 395/275 |
| 5,434,982 | 7/1995 | Calzi | 395/325 |
| 5,491,830 | 2/1996 | Ferri | 395/829 |
| 5,530,948 | 6/1996 | Islam | 395/184.04 |
| 5,586,250 | 12/1996 | Carbonneau et al. | 395/183.2 |

*Primary Examiner*—Christopher B. Shin
*Attorney, Agent, or Firm*—Bernard Bogdon; Andrew J. Dillon

[57] ABSTRACT

An apparatus for providing identification information to a peripheral device connected to a data processing system via a parallel communications interface cable. The apparatus includes a cable connector for connecting to a cable coupled to the data processing system and a peripheral device connector for connecting to the peripheral device. The cable connector and the peripheral device connector are coupled together to provide communication between the data processing system and the peripheral device. The apparatus also includes means for providing identification information to the connected peripheral device. Such identification information is utilized by the peripheral device to set a device identifier. In one embodiment, device identifiers are set utilizing identification information selected in conjunction with the physical location of the peripheral device. In one embodiment, the apparatus is utilized to connect a SCSI hard disk drive to a data processing system and to provide the SCSI hard disk drive information necessary to set a SCSI device identification number.

6 Claims, 8 Drawing Sheets

Fig. 1

Prior Art

METHOD AND APPARATUS FOR AUTOMATICALLY ASSIGNING DEVICE IDENTIFIERS ON A PARALLEL DATA BUS

This is a continuation of application Ser. No. 08/260,640, filed Jun. 16, 1994, abandoned.

BACKGROUND OF THE INVENTION

1. Technical Field

The present invention relates in general to an improved data processing system and in particular to an improved method and apparatus for assigning device identifiers to peripheral devices connected to a data processing system. Still more particularly, the present invention relates to a method and apparatus for assigning device identifiers based upon the physical location of the connected device.

2. Description of the Related Art

In many data processing systems, it becomes necessary to connect a plurality of peripheral devices to the data processing system. Such peripheral devices may include hard disk drives (HDDs), tape drives, CD-ROMs, WORM (write once, read many times) drives, communications devices, multimedia presentation devices, test equipment, and the like. If these peripheral devices are connected to a common bus, or parallel communications bus, an identification or ID is typically assigned to each device so that each peripheral device may be addressed individually by the data processing system and other peripheral devices connected to such a bus.

An example of such a parallel communications bus is the "small computer system interface" bus or "SCSI" bus. SCSI is a parallel, multimaster I/O bus that provides a standard interface between computers and peripheral devices. SCSI defines a special bus cable dedicated to data transfer between a data processing system and up to eight peripheral devices, each having its own controller. SCSI has been an official ANSI standard (ANSI X3.131-1986) since 1986, but its roots go back to the I/O buses used on IBM mainframes as early as the 1960's. In addition to the electrical and physical characteristics of the bus, SCSI defines a series of commands through which devices connected to the bus communicate with each other. SCSI utilizes a single 50-pin cable, which functions as a data and control bus which may daisy-chain up to eight peripheral devices (i.e., host adapters or peripheral controllers).

Figure 1:
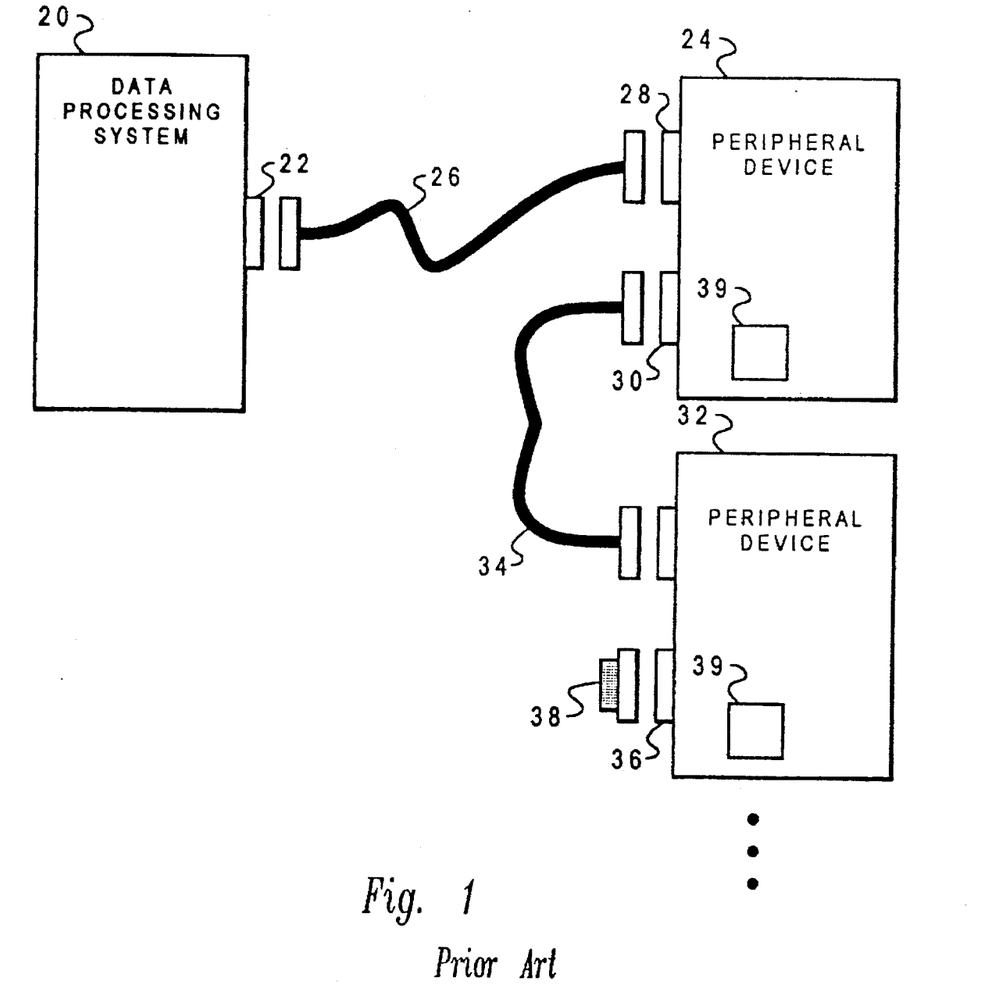
FIG. 1 depicts the connection of a plurality of peripheral devices to a data processing system utilizing a parallel communications bus which is known in the prior art.

In FIG. 1, there is depicted a data processing system coupled to a plurality of peripheral devices via a parallel communications bus. As illustrated, data processing system 20, which has a parallel communications bus connector 22, is coupled to peripheral device 24 via cable 26. Cable 26 is connected to parallel communications bus connector 28 on peripheral device 24. Parallel communications bus connector 28 is connected to parallel communications bus connector 30 within peripheral device 24 to permit connection of additional peripheral devices, such as peripheral device 32. Peripheral device 32 is connected to peripheral device 24 via cable 34 connected to parallel communications bus connector 30.

Typically, a parallel communications bus will require termination at both ends of the bus. Termination may be provided within data processing system 20 for one end of the parallel communications bus; the other end may be terminated at parallel communications bus connector 36 by terminator 38.

In many known parallel communications bus architectures, devices connected to such a bus are distinguished logically by a device ID. Such a device ID may be selectable using address selector 39 internal to peripheral devices 24 and 32. Address selector 39 is utilized to set a device ID so that peripheral devices 24 and 32 may be separately addressed by data processing system 20.

Recently, data processing system user's need for hard disk drive storage space has increased dramatically. To fulfil this need for hard disk storage, data processing system designers have implemented arrays of hard disk drives which work together to provide a large hard disk storage area. Such an array of hard disk may be part of a "redundant array of inexpensive drives," which is also known as "RAID."

However, there is a problem with the RAID that occurs when one of the hard disk drives in the RAID fails. This problem concerns the user's ability to determine which hard disk drive in the array of disk drives failed. If the data processing system user could identify the failed disk drive, the disk drive may be unplugged, removed, and replaced with a working disk drive. In the prior art, the data processing system is able to provide the user the SCSI ID of the failed disk drive, but the data processing system may not be able to provide the physical location of the failed disk drive (i.e., in what bay the physical disk drive is located).

Even though the data processing system user may be able to set SCSI device IDs in a manner corresponding to the physical location of the peripheral device, this requires the user to learn how to set the SCSI device ID. If the user is unfamiliar with how to set the SCSI device ID, or forgets to set the proper ID, or if it is inconvenient to set SCSI device IDs, the SCSI device ID may not correspond to the physical location of the SCSI device. Furthermore, a user who is unfamiliar with how the SCSI devices were installed cannot be sure that the SCSI device ID corresponds to the physical location of the SCSI device.

Therefore, the problem remaining in the prior art is to provide a method and apparatus for automatically assigning an ID to a peripheral device connected to a data processing system based upon the location of the installed peripheral device.

SUMMARY OF THE INVENTION

It is therefore one object of the present invention to provide an improved data processing system.

It is another object of the present invention to provide an improved method and apparatus for assigning device identifiers to peripheral devices connected to a data processing system.

It is yet another object of the present invention to provide a method and apparatus for assigning device identifiers based upon the physical location of the connected device.

The foregoing objects are achieved as is now described. An apparatus is disclosed for providing identification information to a peripheral device connected to a data processing system via a parallel communications interface cable. The apparatus includes a cable connector for connecting to a cable coupled to the data processing system and a peripheral device connector for connecting to the peripheral device. The cable connector and the peripheral device connector are coupled together to provide communication between the data processing system and the peripheral device. The apparatus also includes means for providing identification information to the connected peripheral device. Such identification information is utilized by the peripheral device to set a device identifier. In one embodiment, device identifiers are set utilizing identification information selected in conjunction with the physical location of the peripheral device.

In one embodiment, the apparatus is utilized to connect a SCSI hard disk drive to a data processing system and to provide the SCSI hard disk drive information necessary to set a SCSI device identification number.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
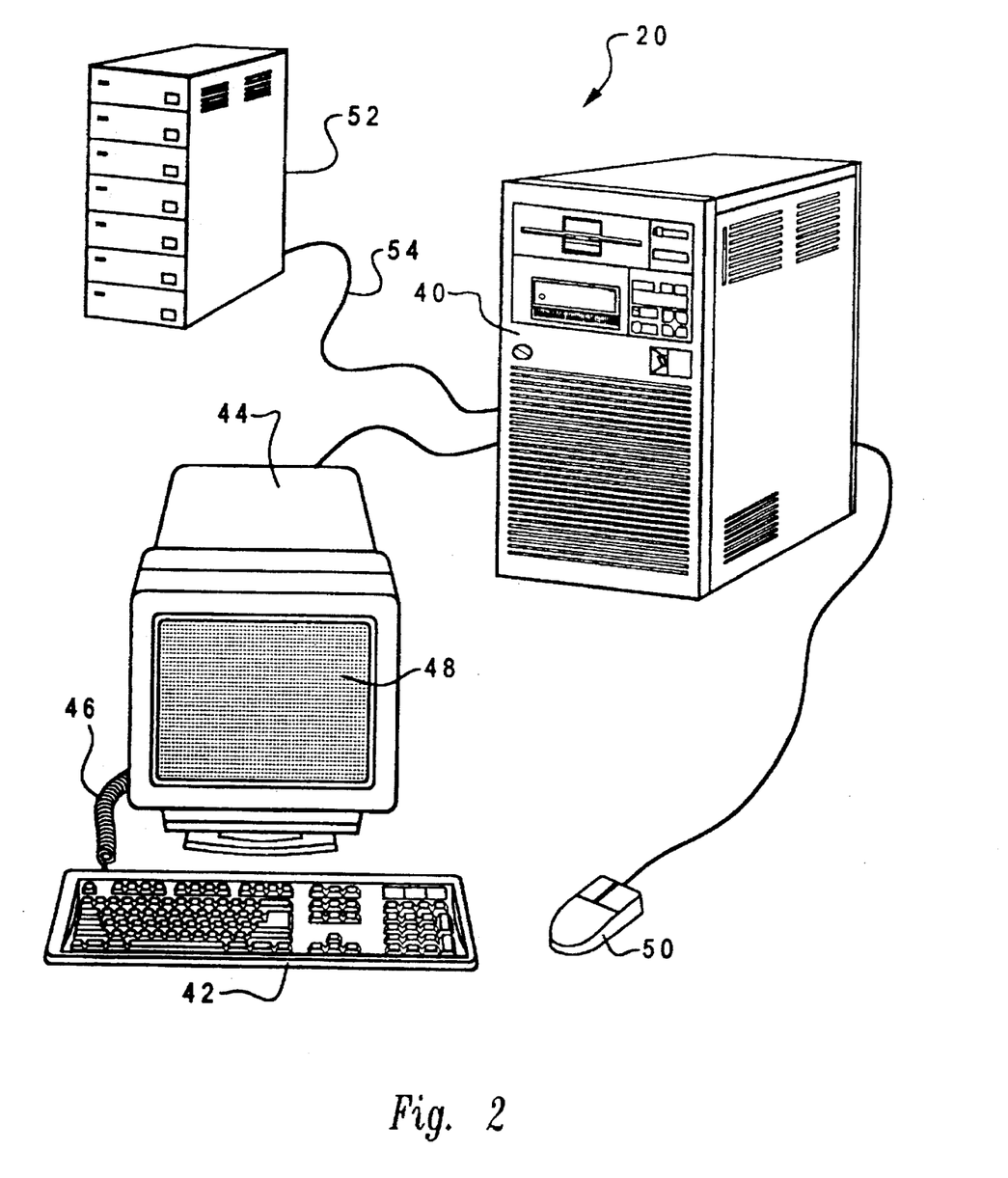
FIG. 2 depicts a data processing system which may be utilized to implement a preferred embodiment of the present invention.

With reference now to the figures and in particular with reference to FIG. 2, there is depicted a data processing system 20 which includes processor 40, keyboard 42, and display 44. Keyboard 42 is coupled to processor 40 via cable 46. Display 44 includes display screen 48, which may be implemented utilizing a cathode ray tube (CRT), a liquid crystal display (LCD), an electroluminescent panel, or the like, data processing system 20 also includes pointing device 50 which may be implemented utilizing a track ball, joystick, touch sensitive tablet or screen, or as illustrated in FIG. 2, a mouse. Pointing device 50 may be utilized to move a pointer or cursor on display screen 48. Processor 40 may also be coupled to one or more peripheral devices 52 via cable 54. In a preferred embodiment cable 54 is a SCSI cable and peripheral device 52 are capable of interfacing with a SCSI bus.

Those persons skilled in the art of data processing system design will recognize that display 44, keyboard 42, and pointing device 50 may each be implemented utilizing any one of several known off-the-shelf components. Data processing system 20 may be implemented utilizing any so-called "personal computer," such as the personal computer sold under the trademark "PS/2" which is manufactured and distributed by International Business Machines Corporation (IBM), of Armonk, N.Y.

Figure 3:
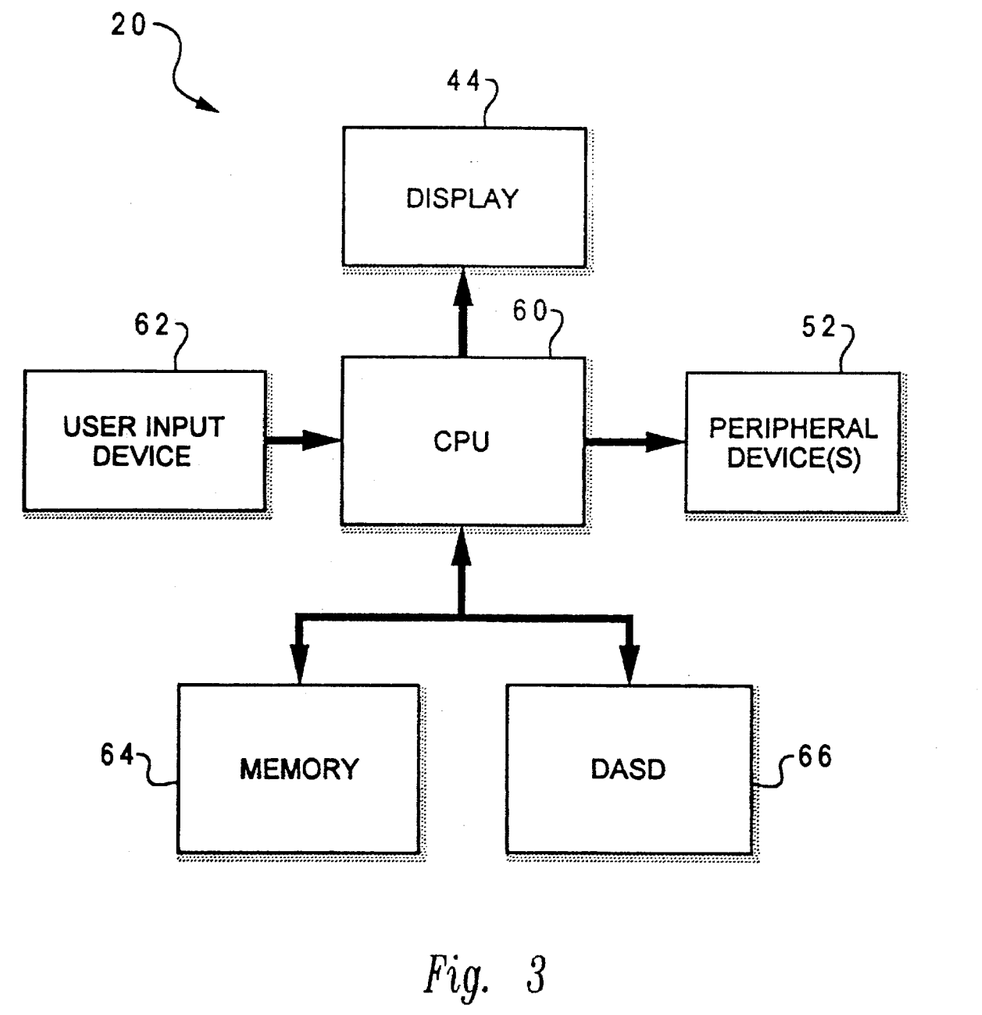
FIG. 3 depicts a more detailed high-level block diagram further illustrating the major components of the data processing system of FIG. 2.

With reference now to FIG. 3, there is depicted a more detailed high-level block diagram further illustrating the major components of data processing system 20 of FIG. 2. Data processing system 20 is controlled primarily by instructions, in the form of software, executed within central processing unit (CPU) 60. CPU 60 is coupled to display 44, which is utilized to display text and graphics, and possibly animated graphics or video. CPU 60 is also coupled to user input device 62, which is utilized to receive input from a data processing system user. User input device 62 may include keyboard 42 and pointing device 50, as illustrated in FIG. 2. Memory 64 and direct access storage device (DASD) 66 may be utilized for storing application programs (i.e., software) and data sets.

Peripheral devices 52 may also be included in data processing system 20. Such peripheral devices may include hard disk drives, tape drives, CD-ROMs, WORM drives, communications devices, multimedia presentation devices, test equipment and the like.

Figure 4:
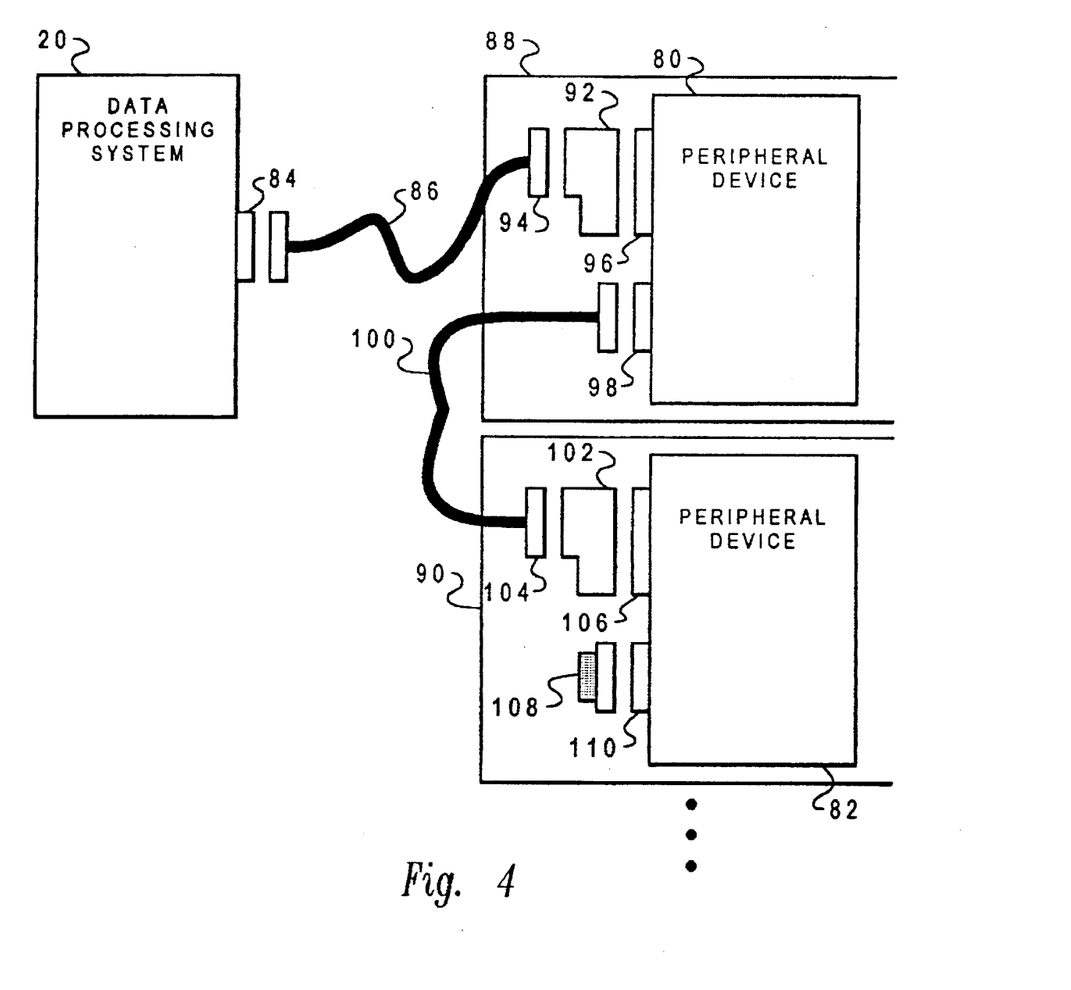
FIG. 4 is a high-level schematic which illustrates the use of an interposer card in accordance with the method and system of the present invention.

With reference now to FIG. 4, there is depicted a high-level schematic which illustrates the use of an interposer card in accordance with the method and apparatus of the present invention. As illustrated, data processing system 20 is coupled to peripheral devices 80 and 82. Data processing system 20 includes a parallel communications bus connector, which in this example is implemented utilizing SCSI bus connector 84. SCSI cable 86 is connected to SCSI bus connector 84 and is utilized to connect data processing system 20 to peripheral device 80.

Peripheral device 80 is located at physical location 88. Similarly, peripheral device 82 is located at physical location 90. Also located at physical location 88 is interposer card 92 and one end of SCSI cable 86. Interposer card 92 is connected between connector 94 of SCSI cable 86 and connector 96 of peripheral device 80. Within peripheral device 80 connector 96 may bi-directionally pass SCSI signals between connector 96 and connector 98. SCSI cable 100 is utilized to connect peripheral device 82 to peripheral device 80, and in turn to data processing system 20. Interposer card 102 is connected between connector 104 of SCSI cable 100 and connector 106 of peripheral device 82 in a manner similar to that described above.

Additional physical locations for connecting additional peripheral devices may be provided as indicated by the ellipsis. In accordance with SCSI bus standards terminator 108 is connected to connector 110 of peripheral device 82, which in this example is the last peripheral device connected to the SCSI bus.

Interposer card 92 connects to SCSI cable 86 at connector 94. Interposer card 92 may receive and transmit standard SCSI signals to and from data processing system 20 at connector 94. Interposer card 92 connects to peripheral device 80 at connector 96. Connector 96 may include additional connections to interface with a connector identifier (not shown in this figure) within interposer card 92.

Such a connector identifier may be read by peripheral device 80 through connector 96, and may be set according to the identification of physical location 88. For example, if physical location 88 is identified as bay "two," the connector identifier within interposer card 92 may likewise be set to "two." Similarly, if physical location 90 is identified as bay "three," the connector identifier within interposer card 102 may be set to "three." It should be understood, however, that the connector identifier set in the interposer card need not be the same as the identifier associated with the physical location.

The connector identifier may be implemented utilizing "pins" and "jumpers" which may be read from connector 96 by peripheral device 80 when interposer card 92 is connected. By selectively placing or removing jumpers across such pins, the connector identifier may be set or selected for an interposer card located at a physical location. In order to maintain the association between the connector identifier, the connector, and the physical location, the interposer card should remain connected to the SCSI cable and both should remain at the same physical location. For example, interposer card 92 should remain connected to connector 94 within physical location 88 once the connector identifier within interposer card 92 has been set and associated with physical location 88. If cables and interposer cards are moved without resetting the connector identifier, the ability of data processing system 20 to identify a physical location having a failed peripheral device is destroyed.

Figure 5:
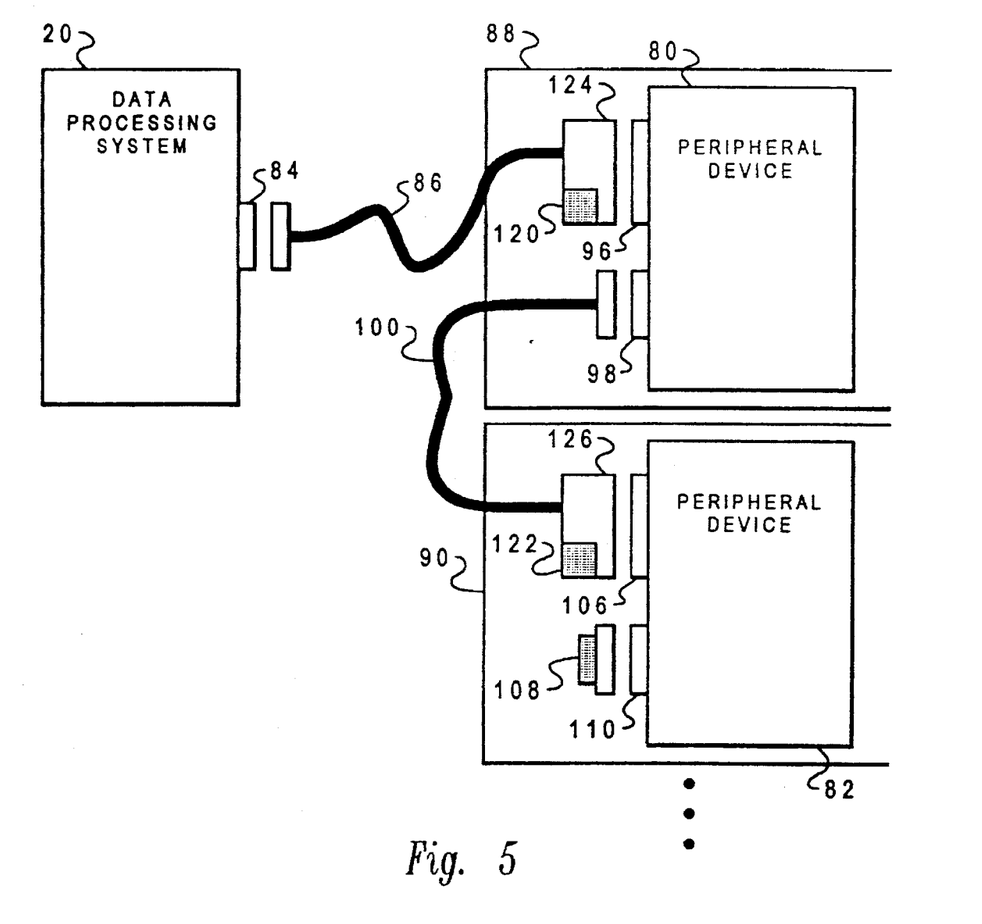
FIG. 5 depicts a high-level schematic diagram illustrated the connection of peripheral devices to a data processing system utilizing a cable incorporating a connector identifier in accordance with the method and system of the present invention.

With reference now to FIG. 5, there is depicted a high-level schematic diagram illustrated the connection of peripheral devices to a data processing system utilizing a cable incorporating a connector identifier in accordance with the method and apparatus of the present invention. As illustrated, peripheral devices 80 and 82 are connected to data processing system 20 via cables 86 and 100 in a manner similar to that discussed with reference to FIG. 4. In this embodiment, however, the connector identifier has been incorporated into cables 86 and 100, as illustrated by connector identifiers 120 and 122, respectively. Connector identifiers 120 and 122 may be implemented utilizing pins and jumpers, or small switches, within connector 124. Connector 124 includes connections necessary to implement a SCSI bus connection and additional pins necessary to facilitate the reading of connector identifier 120. Connector identifier 122 is implemented in a manner similar to that of connector identifier 120 within connector 126. Connector identifier 122 should be set to a different ID than connector identifier 120.

Figure 6:
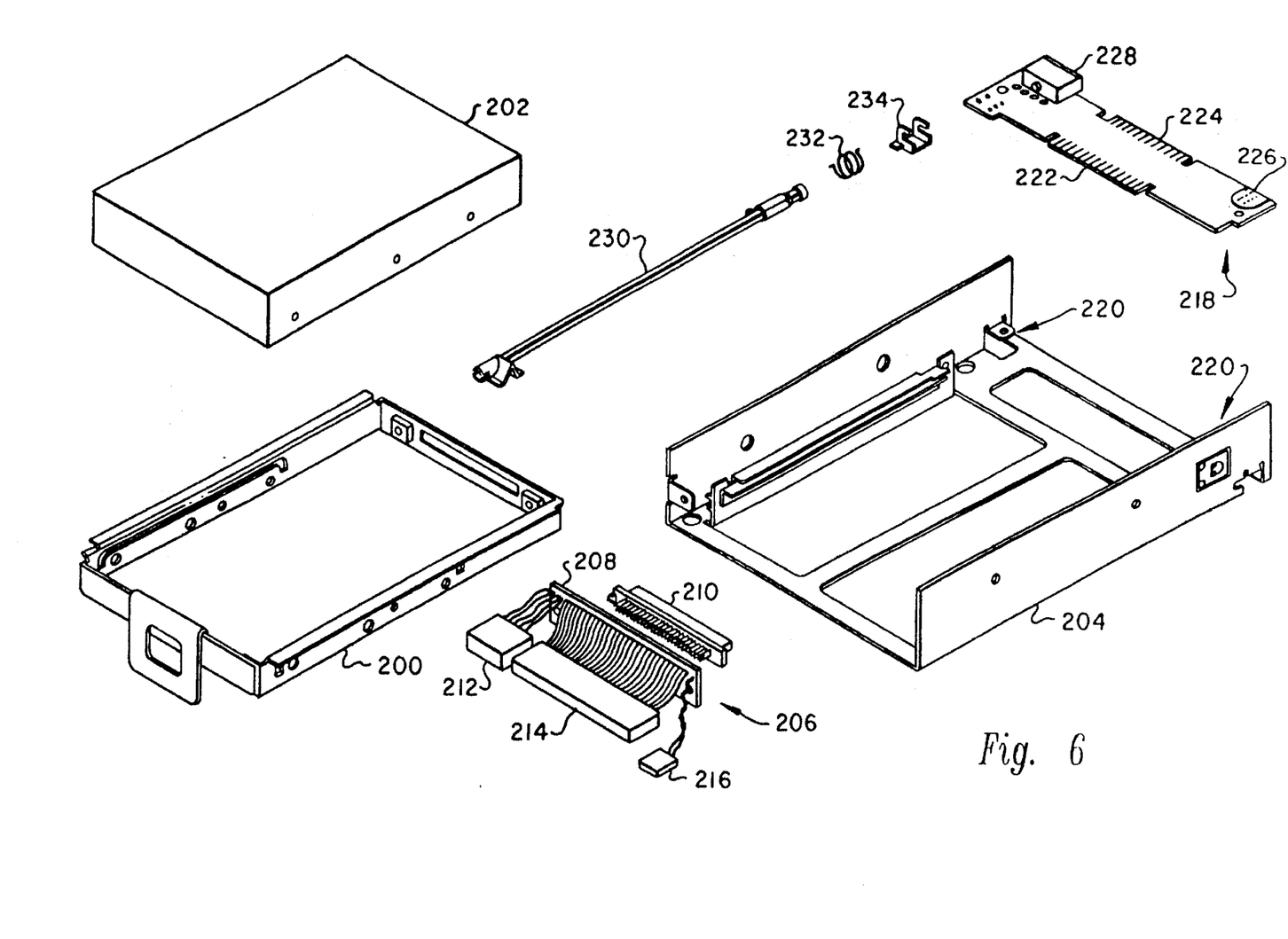
FIG. 6 is an exploded view of a SCSI hard disk drive bay having an apparatus for providing identification information to the SCSI hard disk drive in accordance with the method and apparatus of the present invention.

With reference now to FIG. 6, there is depicted an exploded view of a SCSI hard disk drive bay having an apparatus for providing identification information to the SCSI hard disk drive in accordance with the method and apparatus of the present invention. When assembled, tray 200 receives SCSI hard disk drive 202. Tray 200 and SCSI hard disk drive 202 together slide into adapter 204.

Also mounted to tray 200 is card assembly 206. Card assembly 206 is comprised of circuit board 208, edge connector 210, power connector 212, SCSI connector 214, and SCSI ID cable 216. Power connector 212, SCSI connector 214, and SCSI ID cable 216 all connect to the rear portion of SCSI hard disk drive 202. Power connector 212 supplies power to SCSI hard disk drive 202. SCSI connector 214 carries standard SCSI signals to and from SCSI hard disk drive 202. SCSI ID cable 216 provides information which will be utilized to set the SCSI hard disk drive ID within SCSI hard disk drive 202. Power connector 212, SCSI connector 214, SCSI ID cable 216, and edge connector 210 are all connected to circuit board 208.

Circuit board 218 is mounted near the rear of adapter 204 utilizing mounting brackets 220. Circuit board 218 includes two edge connectors, edge connector 222 and 224. Edge connector 224 carries standard SCSI signals to and from data processing system 20 (not shown). Such SCSI signals at edge connector 224 are coupled to edge connector 222. SCSI ID pins 226 are connected to edge connector 222 such that they may be read by SCSI hard disk drive 202 when installed in adapter 204. Thus, edge connector 222 contains extra contacts, some of which are utilized to connect to SCSI ID pins 226.

Power switch 228 is also mounted to circuit board 218, and is utilized to connect and interrupt power to SCSI disk drive 202. Shaft 230, spring 232, and shaft holder 234 are mounted to adapter 204 and circuit board 218, and cooperate together to operate power switch 228 from the front of adapter 204. Shaft 230 is only permitted to operate power switch 228 when rotated to a selected position, thereby providing a mechanism to ensure power is removed from SCSI hard disk drive 202 before SCSI hard disk drive 202 may be removed from adapter 204.

In operation, SCSI signals pass from edge connector 224 to edge connector 222. Once hard disk drive 202 has been inserted into adapter 204, edge connector 210 connects to edge connector 222 and couples such SCSI signals to SCSI connector 214 through circuit board 208. The SCSI signals are then coupled to hard disk drive 202 through SCSI connector 214. The SCSI ID within SCSI hard disk drive 202 is set after SCSI hard disk drive 202 has read SCSI ID pins 226 via edge connector 222, edge connector 210, circuit board 208, and SCSI ID cable 216, which is connected to SCSI hard disk drive 202. SCSI ID pins 226 are selectively "jumped" to provide a unique connector identifier associated with the bay defined by adapter 204. Additional adapters 204 may be included within a group of peripheral devices connected to data processing system 20 (not shown) and each will have a unique connector identifier set by jumpers connected between SCSI ID pins 226 in each additional bay.

Figure 7:
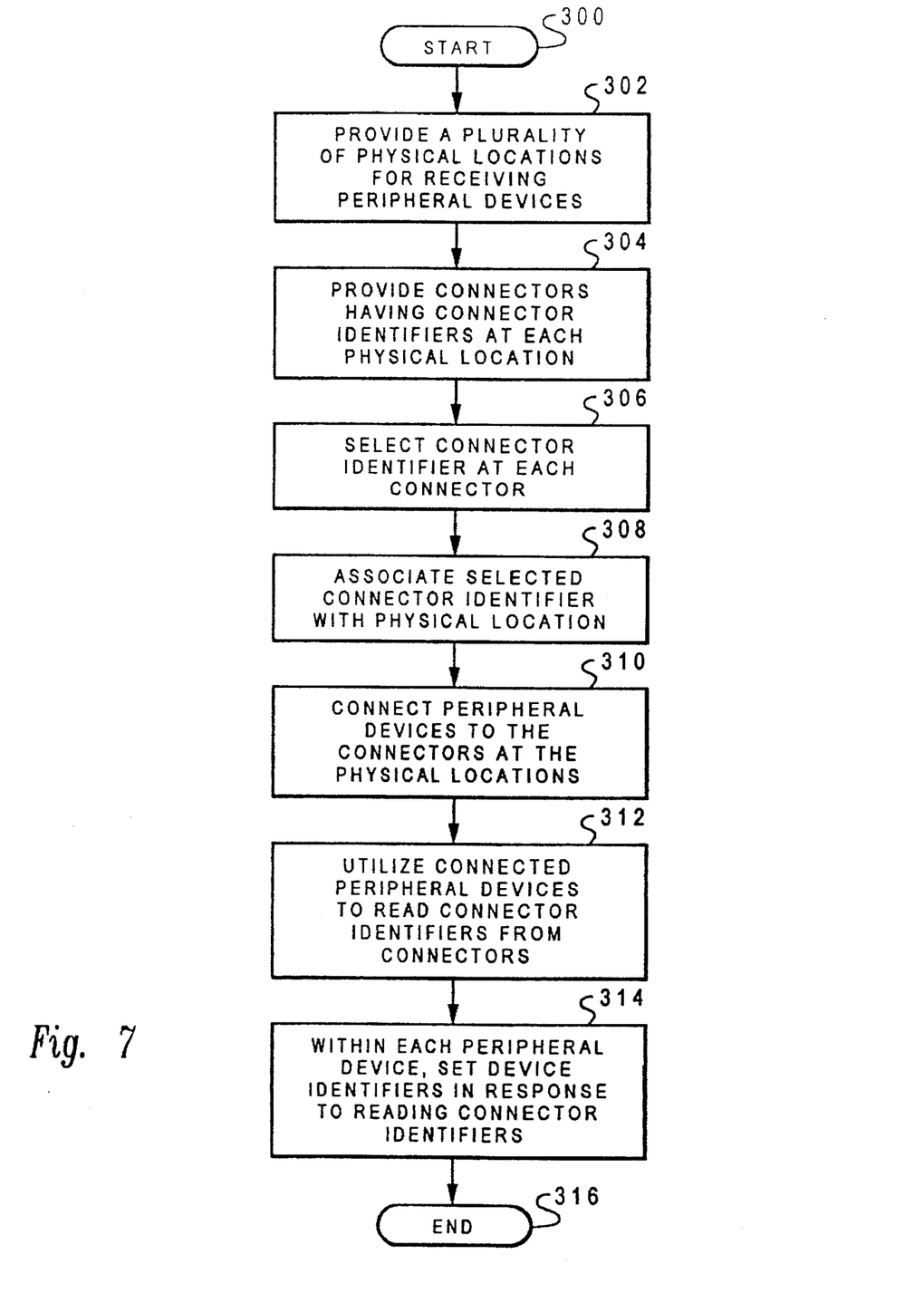
FIG. 7 is a high-level logic flowchart which illustrates the process of automatically assigning a device identifier to a connected peripheral device in accordance with the method and apparatus of the present invention.

With reference now to FIG. 7, there is depicted a high-level logic flowchart which illustrates the process of automatically assigning a device identifier to peripherals connected to a data processing system in accordance with the method and apparatus of the present invention. As illustrated, the process begins at block 300 and thereafter passes to block 302. Block 302 illustrated the provision of a plurality of physical locations for receiving peripheral devices. Such physical locations may be as simple as providing space along side the data processing system. In other implementations, such physical locations may take the form of bays in an equipment rack. Such a bay may be defined as any of various compartments or sections used to support or house electronic equipment. As illustrated in FIG. 6, the area defined by adapter 204 may be considered a bay.

Next, connectors are provided at each physical location, as depicted at block 304. Such connectors each include a connector identifier which may be read or interrogated by a connected peripheral device. Such a connector identifier may be implemented utilizing a plurality of pins which are selectively electrically connected in a pattern which identifies the connector, wherein such pattern may be read by a peripheral device when the connector is connected to a peripheral device. In other implementations, such connector identifier may be a mechanical configuration which is detectable by a connected peripheral device, or such connector identifier may be read or interrogated by a peripheral device optically or electromagnetically. Thus, the connector identifier may be implemented by any means which may provide a connector identifier to a connected peripheral device.

As illustrated at block 306, the process then selects a connector identifier at each connector located at each physical location. Typically, the connector identifiers are selected so that each connector identifier is unique. Connector identifiers may also be selected to correspond to the physical location of the connector. For example, a connector identifier of a connector at physical location 1 may be set to 1. One important aspect of the present invention is to maintain an association between the connector identifier and the physical location of the connector. Such an association allows the data processing system to translate a connector identifier into a physical location upon the failure of a peripheral device connected to that connector. For example, if a connector having connector identifier 3 is located at physical location identified as 5, upon the failure of a peripheral device connected to connector 3, the data processing system may inform the user to replace the peripheral device located at physical location 5. Such an association between connector identifier and physical location may be implemented within data processing system 20 (see FIGS. 4 and 5). The association of the selected connector identifier with the physical location of the connector is depicted at block 308.

Next, peripheral devices are connected to the connectors located at the physical locations, as illustrated at block 310. Once connected, the peripheral devices read the connector identifiers from the connectors, as depicted at block 312. As discussed above, the connector identifiers may be read electrically, mechanically, optically, or sensed electromagnetically.

Finally, as illustrated at block 314, each peripheral device sets an internal device identifier in response to reading a connector identifier in the connector connected to the peripheral device. Such a device identifier is utilized to identify the peripheral device to another peripheral device or data processing system connected to parallel data bus, which in this example is a SCSI bus. Commands and data are transmitted from one peripheral device to another based upon such device identifiers. Device identifiers may also be used to transmission conflicts on the parallel bus. For example, the device with the highest device identifier may take priority after a bus contention problem. Thus, the present invention automatically assigns a device identifier to a peripheral device connected to a connector having a connector identifier associated with a physical location. Utilizing the present invention, the data processing system may inform a data processing system user of the physical location of a failed peripheral device. Informing a user of a peripheral device physical location may be more useful to the user than merely being informed that a peripheral device having a particular device identifier has failed. Once the user knows the physical location of the failed peripheral device, the user may be able to replace the failed device with a working unit. If the user does not know the physical location of the failed device, it may be quite a task to identify the failed unit if the user is only given a device identifier. Such difficulty may be due to the fact that device identifiers may not be indicated from a clearly visible portion of the failed peripheral device.

Figure 8:
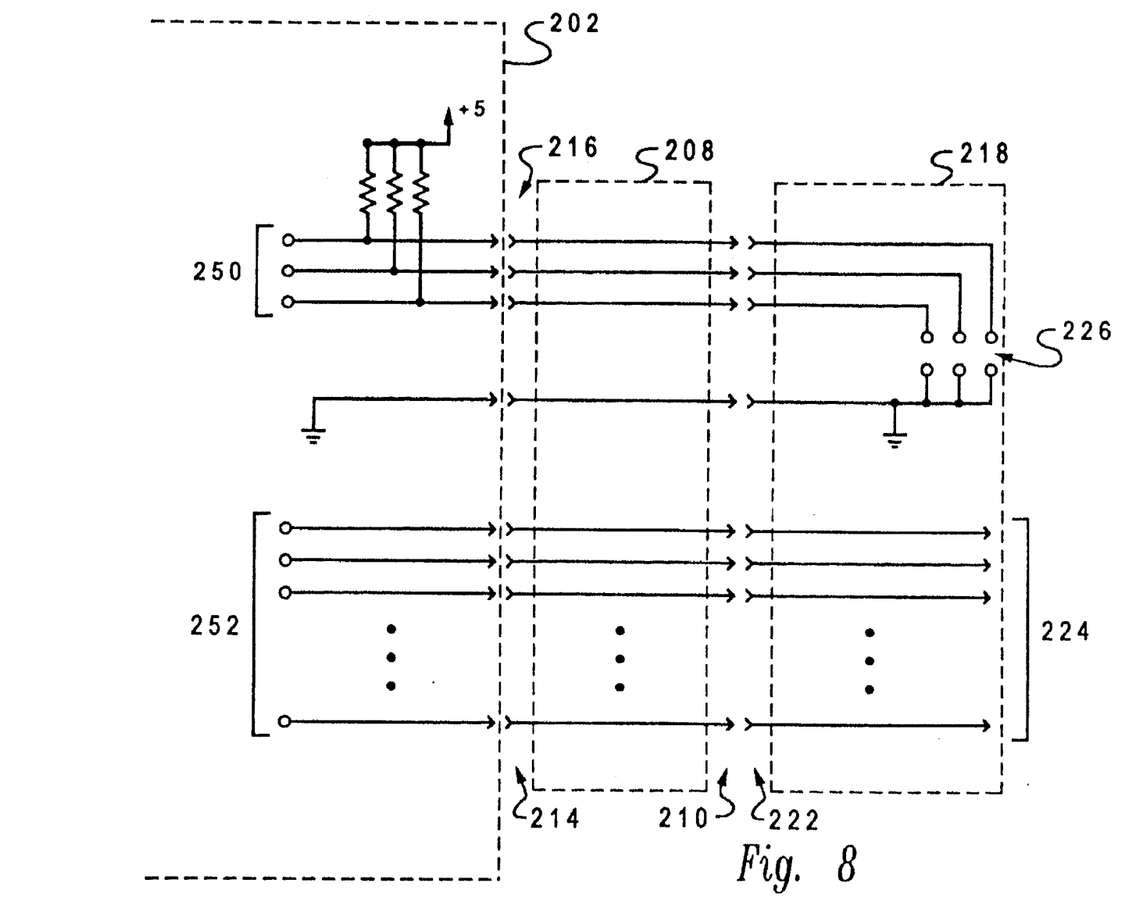
FIG. 8 is a schematic diagram illustrating the circuit utilized by a peripheral device to read a connector identifier in accordance with a preferred embodiment of the method and apparatus of the present invention.

With reference now to FIG. 8, there is depicted a schematic diagram of portions of a SCSI hard disk drive, and two circuit board assemblies depicted in FIG. 6 in accordance with the method and apparatus of the present invention. As illustrated within hard disk drive 202, pins 250 may be utilized to read a connector identifier which may be selected by SCSI ID pins 226 on circuit board 218. Pins 252 may be utilized to send and receive standard SCSI bus signals. Such SCSI bus signals are communicated through SCSI connector 214 to circuit board 208. From circuit board 208 such SCSI signals are coupled to circuit board 218 via edge connector 210 which connects with edge connector 222. Edge connector 222 and 210 also couple SCSI ID pins 226 to SCSI ID cable 216, which in turn connects to SCSI hard disk drive 202. SCSI ID pins 226 may be selectively "jumped" to set the connector identifier which may be read by SCSI hard disk drive 202 at pins 250. Jumper pins may be utilized to selectively pull pins 250 to a low or zero voltage. If no jumper appears across SCSI ID pins 226, pins 250 will remain at a high or a one voltage.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a data processing system capable of connecting to peripheral devices for automatically assigning a device identifier to said connected peripheral devices, said method comprising the steps of:

provided a plurality of physical locations for receiving peripheral devices;

providing connectors at each of said plurality of physical locations for coupling said peripheral devices to said data processing system;

associating one of a plurality of connector identifiers with each of said connectors;

associating each of said plurality of physical locations with one of said plurality of connector identifiers;

connecting each of said peripheral devices to one of said connectors, wherein said peripheral devices are coupled to said data processing system;

within each of said peripheral devices, reading one of said plurality of connector identifiers associated with said one of said connectors from said one of said connectors connected to each of said peripheral devices; and automatically setting said device identifier within each of said peripheral devices in response to reading said one of said plurality of connector identifiers, said device identifier being associated with said one of said plurality of connector identifiers associated with said one of said plurality of connectors, wherein said device identifier is associated with said physical location for each of said peripheral devices.

2. The method in a data processing system for automatically assigning a device identifier according to claim 1 wherein said one of said plurality of connector identifiers includes electrical connections connected to provide said one of said plurality of connector identifiers, and wherein said step of automatically setting said device identifier includes automatically setting said device identifier in response to reading said electrical connections connected to provide said one of said plurality of connector identifiers.

3. The method in a data processing system for automatically assigning a device identifier according to claim 1 wherein said plurality of physical locations includes bays, and wherein said step of providing a plurality of physical locations for receiving peripheral devices includes providing bays for receiving peripheral devices.

4. The method in a data processing system for automatically assigning a device identifier according to claim 1 wherein said connectors at each of said plurality of physical locations for coupling said peripheral devices to said data processing system includes SCSI type connectors, and wherein said step of providing connectors at each of said plurality of physical locations for coupling said peripheral devices to said data processing system includes providing SCSI type connectors at each of said plurality of physical locations for coupling said peripheral devices to said data processing system, wherein said SCSI type connectors each are associated with one of a plurality of connector identifiers which may be read by one of said peripheral devices connected to said SCSI connector.

5. The method in a data processing system for automatically assigning a device identifier according to claim 1 wherein said peripheral devices includes SCSI hard disk drives.

6. The method in a data processing system for automatically assigning a device identifier according to claim 1 wherein said one of said plurality of connector identifiers includes a binary SCSI device identification number.

* * * * *